United States Patent

[11] 3,622,119

| [72] | Inventor | Joseph Paul Weber |
| | | Houston, Tex. |
| [21] | Appl. No. | 51,481 |
| [22] | Filed | July 1, 1970 |
| [45] | Patented | Nov. 23, 1971 |
| [73] | Assignee | ACF Industries, Incorporated |
| | | New York, N.Y. |

[54] MECHANICAL ACTUATOR HAVING LOCKING MECHAMISM
13 Claims, 5 Drawing Figs.

[52] U.S. Cl. .................................................. 251/96,
74/89.15, 74/509, 74/527
[51] Int. Cl. .......................................................... F16k 35/00,
G05g 5/20
[50] Field of Search .......................................... 74/89.14,
89.15, 527, 528, 509; 251/77, 79, 81, 96, 95, 97;
137/385

[56] References Cited
UNITED STATES PATENTS
1,650,312 11/1927 Wildin et al. ................. 251/163

2,318,010 5/1943 Panish ......................... 251/96 X
3,011,720 12/1961 Ives ............................. 251/77 X

*Primary Examiner*—Henry T. Klinksiek
*Attorney*—James L. Jackson

ABSTRACT: A mechanical actuator for valves and other mechanical devices, according to the present invention, includes a locking mechanism disposed about a rotatable valve-actuating stem that normally maintains the actuator in a locked condition, thereby preventing inadvertent movement of the valve or other mechanical device with which the actuator may be associated. The locking mechanism is unlocked upon predetermined initial rotation of a handwheel or other means for rotating the actuating stem of the mechanical actuator, thereby allowing the actuator to open or close the valve mechanism. Cessation of rotation of the handwheel or overrunning of the actuator that might occur by pressure actuation of the valve will cause automatic relocking of the actuator.

JOSEPH PAUL WEBER
INVENTOR.

BY
James D Jackson
ATTORNEY

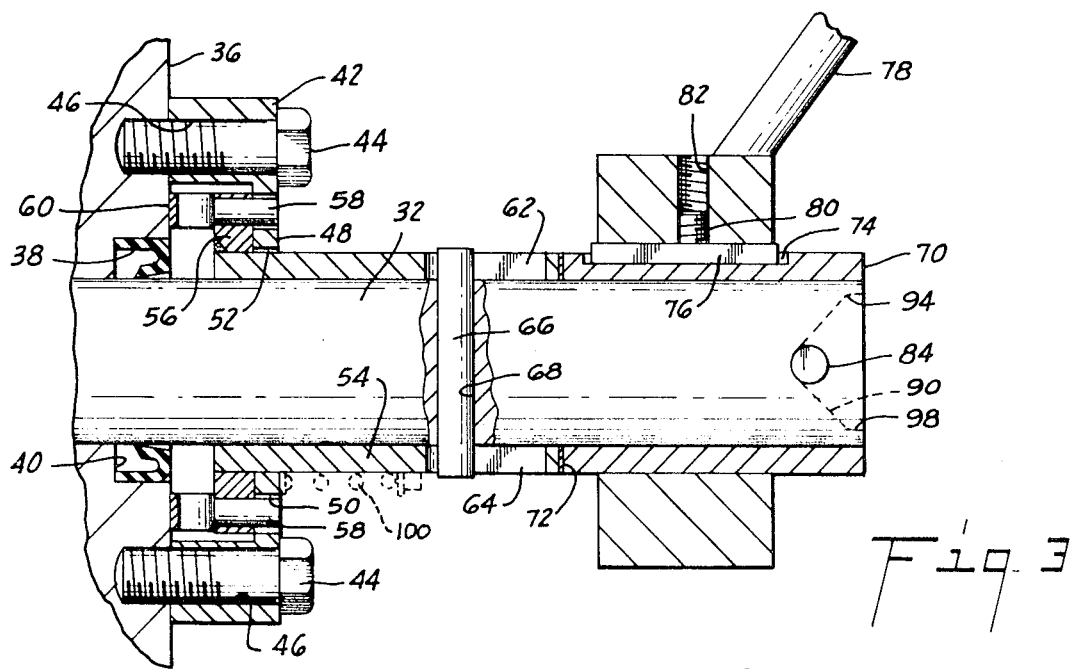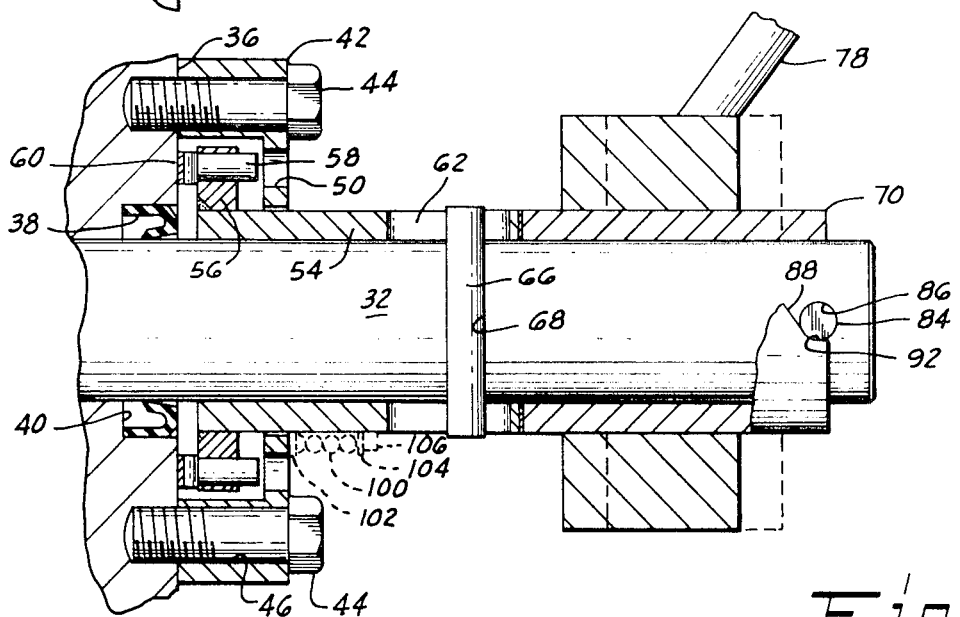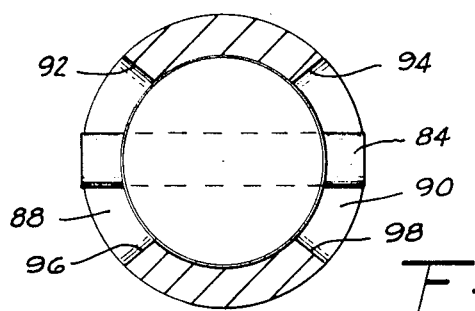

MECHANICAL ACTUATOR HAVING LOCKING MECHAMISM

BACKGROUND OF THE INVENTION

This application relates generally to actuators for valves and other mechanical devices and more particularly relates to actuators of the antifriction ball screw or "Saginaw" type that are utilized because of their extremely low friction characteristics. Ball screw or Saginaw threads have come into ever-increasing use in recent years and have been found to offer significant advantages in a great many different applications where it is desired to convert rotary motion to linear motion or vice versa with a minimum of friction and wear. Ball screw thread systems have been found especially valuable in valve actuator application because of the extremely high torque generally required to impart linear movement to the control stem of a valve that is subjected to operating pressure. The Saginaw threaded has also been successfully used in quarter-turn valve actuators that are designed to impart rotation to various types of plug valves.

The ball screw type actuator is subject to the disadvantage, however, that because of its low friction characteristics, it is subject to "overhauling," i.e., counterrotating due to forces applied to the valve element by fluid under line pressure. Overhauling of a valve actuator may result in inadvertent Overhauling of production, thereby causing production losses. The tendency of a valve actuator to overhaul may also result in movement of the valve element to a throttling position that under particular circumstances, may create severe wear and damage to the valve structure, requiring replacement thereof. Overhauling of the valve may also result in accidental leakage, thereby creating a dangerous or otherwise undesirable condition or a valve may accidentally move to a position developing a condition of danger to personnel or equipment. These characteristics of ball screw or Saginaw-type actuators clearly point out the need for a mechanism that is capable of positively retaining or locking a valve in any desired position.

BRIEF DESCRIPTION OF THE PRIOR ART

Valves and valve actuators historically have been provided with various types of locking devices to prevent inadvertent actuation of a valve or to retain the valves in a predetermined position for throttling or the like. Usually, the locking devices are costly additional structures that positively lock the actuator or valve structure against movement and which must be separately unlocked before the valve or valve actuator can be moved. This usually results in fairly slow operation of the valve or actuator which can be hazardous in the event fast actuation of the valve is necessary.

Various positioning mechanisms are frequently employed to retain a valve element such as a butterfly valve in a control or throttling position, such as is taught in U.S. Pat No. 3,349,639. It should be noted that this patent does not relate to ball screw or Saginaw-type valve actuators, and, therefore, materially differentiates from the invention at hand.

SUMMARY OF THE INVENTION

To overcome the above-noted deficiencies in ball screw or Saginaw-type actuators, the present invention has for an important object, the provision of a novel ball screw valve-actuating mechanism that will positively retain the associated valve in any desired position and will eliminate any tendency of the valve actuator to overhaul.

It is a further object of the present invention to provide a novel valve actuator structure that is capable of becoming automatically locked in the event the valve element begins to be moved by line pressure faster than the actuator is being manipulated.

It is an even further object of the present invention to provide a novel ball screw type valve actuator that becomes automatically locked upon cessation of rotation of the handwheel or other valve prime mover mechanism.

Among the several objects of the present invention is noted the provision of a novel valve-actuating structure that may be unlocked and actuated simply by rotating the actuator handwheel in either rotative direction thereof.

It is another important object of the present invention to provide a novel ball screw type valve actuator that remains in assembly with the handwheel or power unit to all times, and need not be additionally manipulated before locking or unlocking of the valve actuator can occur.

It is also an object of the present invention to provide a novel ball screw type valve actuator mechanism that is simple in nature, reliable in use and low in cost.

Other and further objects, advantages, and features of this invention will become apparent to one skilled in the art upon consideration of the written specification, the attached claims and the annexed drawings. The form of the invention which will now be described in detail illustrates the general principles of the invention, but it is to be understood that this detailed description is not to be taken as limiting since the scope of the invention is thus defined by the appended claims. Such description will be referred to by reference characters in the drawings in which:

FIG. 3 is a fragmentary plan view of the valve actuator structure of FIG. 1, illustrating the stem-locking mechanism of the actuator in section and showing the locking mechanism in the locked position thereof.

FIG. 4 is a fragmentary elevational view of the actuator mechanism of FIG. 2, illustrating the actuator locking mechanism thereof in section and showing the locking mechanism in the unlocked position thereof.

FIG. 5 is a fragmentary end view of the actuator mechanism of FIGS. 3 and 4, illustrating the actuator camming structure in detail.

DESCRIPTION OF PREFERRED EMBODIMENT

Figure 1:
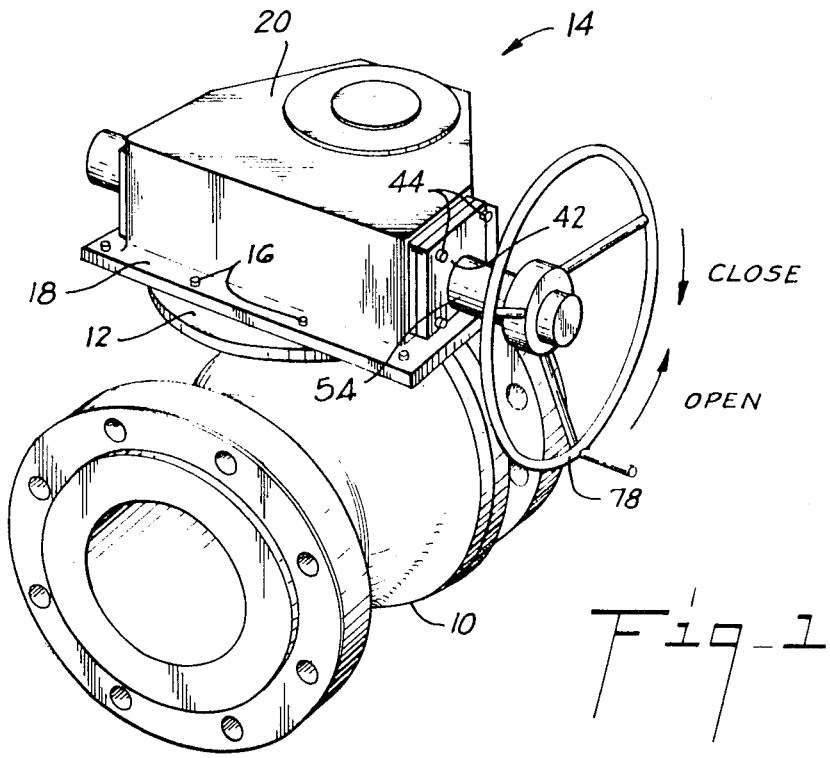
FIG. 1 is an isometric view of a spherical plug valve having a ball screw or Saginaw thread type valve actuator fixed thereto, which actuator is constructed in accordance with the present invention.
Figure 2:
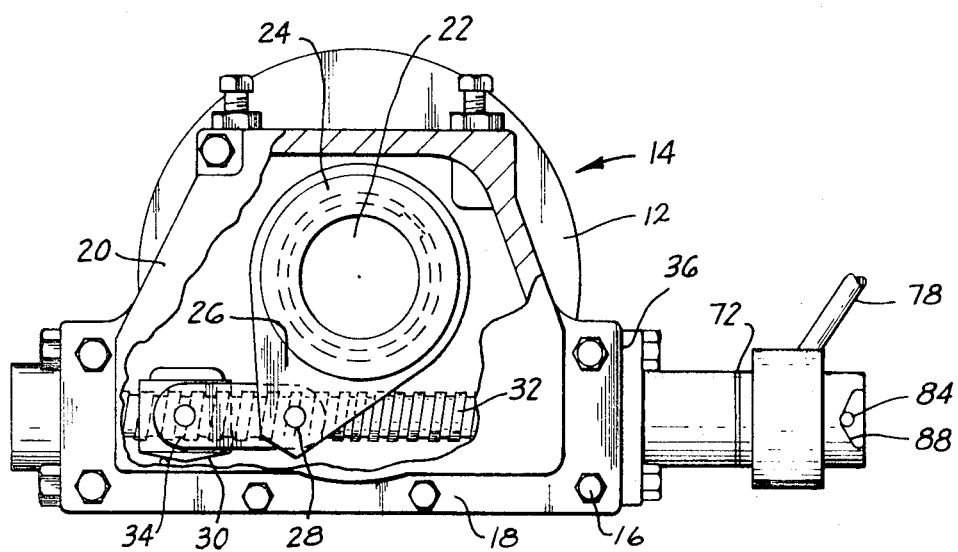
FIG. 2 is a plan view of the valve actuator structure of FIG. 1, having parts thereof broken away to show internal portions of the actuator.

With reference now to the drawings for a more detailed description of the present invention, a valve, of the conventional spherical plug type, is illustrated generally at 10 that includes an actuator-mounting flange 12 disposed at the upper extremity thereof. A valve actuator of the ball screw or Saginaw type, illustrated generally at 14, is secured to the actuator-mounting flange by bolt members 16 that extend through bolt apertures formed in a base wall 18 of an actuator housing 20. A rotatable actuating stem 22 of the valve extends upwardly through an appropriate aperture formed in the base wall 18 of the housing 20 and is suitably keyed at the upper extremity thereof to a hub 24 having upper and lower crank arms 26 extending integrally therefrom. The arms 26 are pivotally connected at 28 to a nut 30 of the Saginaw or ball screw type.

The nut 30 is retained in engagement with a rotatable actuator shaft 32 by a plurality of ball bearings 34 in well-known manner. For such further details of the internal valve actuator mechanism as is necessary for a complete understanding of the present invention, reference may be had to U.S. Pat. No. 3,063,298, that discloses a ball screw valve actuator of this general type.

The rotatable actuator shaft 32 is retained by suitable thrust bearings disposed within the housing 20. At least one extremity of the actuating stem 32 extends through an end wall 36 of the actuator housing 20 and is maintained in sealed relation with the housing by an annular sealing member 38 received within a recess 40 defined within the housing wall.

For the purpose of locking the actuator stem against rotation relative to the housing 20, a locking base 42 is secured to the end wall 36 by a plurality of bolts 44 extending through apertures 46 formed in the locking base. The locking base is provided with an annular flange 48, defined at the outer extremity thereof, that is provided with a plurality of locking recesses 50 that may be apertures, as shown, but may take any other suitable configuration if desired. The number and positioning of the locking recesses will determine various positions at which the mechanism will be allowed to become locked. The flange 48 defines an aperture 52 through which the actuator stem extends. A locking sleeve 54 is received about the actuator stem 32 and is provided with a flange 56 supporting a plurality of pins 58 that are positioned to be received within the locking recesses 50. A wave spring 60, or any other suitable biasing mechanism, is interposed between the flange 56 and the housing wall 36 and biases the locking sleeve 54 outwardly away from the end wall. The locking pins 58 are, therefore, urged by the compression spring 60 toward engagement with the locking recesses 50, so that under normal conditions the locking sleeve 54 is nonrotatable with respect to the actuator housing.

The locking sleeve 54 is provided with opposed elongated openings 62 and 64 in which are located the extremities of a transverse pin member 66, fixed within an aperture 68 extending transversely through the actuating stem 32. The elongated slots 62 and 64 allow the locking sleeve 54 to move axially within limits defined by the length of the slots to achieve disengagement of the locking pins 58 from the recesses 50.

A driving sleeve 70 is disposed about the actuating stem 32 and abuts a bearing member 72 interposed between the locking sleeve 54 and the drive sleeve. The drive sleeve 70 is provided with a keyway 74 receiving a key 76 that secures a handwheel 78 or any other desirable prime mover to the drive sleeve 70. A setscrew 80 is received within a threaded bore 82 formed in the handwheel structure 78 in order to lock the key member 76 to prevent separation thereof from the keyway 74.

With reference now to FIGS. 3, 4, and 5, a drive pin 84 is fixed within a transverse bore 86 formed in the actuator stem 32. A pair of opposed generally V-shaped cam surfaces 88 and 90 are formed in the drive sleeve 70 for engagement with the extremities of the drive pin 84. The compression spring 60 normally biases the locking sleeve 54 and drive sleeve 70 outwardly, causing the cam surfaces 88 and 90 to be maintained at all times in compressive engagement with the extremities of the drive pin 84. As illustrated, particularly in FIG. 5, the drive sleeve 70 is provided with a plurality of drive surfaces 92, 94, 96, and 98, formed contiguous with the V-shaped cam surfaces 88 and 90. The drive surfaces are disposed for engagement with the drive pin 84 to provide a direct driving relation between the drive pin and the drive sleeve 70 after the drive sleeve has been rotated a predetermined amount relative to the actuator stem 32.

An alternative construction is illustrated in dash line in FIGS. 3 and 4, to accomplish biasing of locking sleeve 54 outwardly away from the wall 36 of the actuator housing. Instead of the wave-type compression spring 60, a spiral wound or helical compression spring 100 may be interposed between a pair of washerlike members 102 and 104 surrounding the locking sleeve 54. A snapring 106, or the like, would be retained within an appropriate groove formed in the external periphery of the locking sleeve 54 in order to secure the spring 100 and washers 102 and 104 into assembly in such manner as to bias the locking sleeve 54 outwardly.

OPERATION

The locking mechanism of the actuator will be disposed in the FIG. 3 position thereof at all times when the handwheel 78 or other appropriate prime mover is not being rotated. Assuming the valve 10 to be in its closed position and opening movement is desired, personnel controlling the actuator would simply grasp the handwheel 78 and rotate the same counterclockwise to cause the opening movement. Before counterclockwise opening bias is induced to the handwheel structure 78, it should be noted that the locking sleeve 54 will be biased outwardly to the FIG. 3 position thereof, causing the locking pins 58 to engage the locking recesses, thereby preventing rotation of the locking sleeve and also securing the actuator shaft 32 against rotation. As the drive sleeve 70 is rotated counterclockwise, by the handwheel 78, cooperation between the V-shaped cam surfaces 88 and 90 and the pin 84 causes the drive sleeve to be driven axially as it is rotated. After rotation of the drive sleeve 70, approximately 30°, depending upon the configuration of the cam surfaces, the locking pin 84 will engage the opposed drive surfaces 92 and 98, as illustrated in FIG. 5, thereby establishing a direct driving relation between the drive sleeve 70 and the actuator stem 32. As the drive pin is brought into engagement with the drive surfaces, the drive sleeve, moving axially in abutment with the locking sleeve 54, causes the locking sleeve to move to the FIG. 4 position thereof, thereby clearing the locking pins 58 from the recesses 50 and simultaneously freeing the actuator stem for rotation. Axial movement of the locking sleeve 54 is allowed by the elongated slots 62 and 64 that are provided to prevent relative rotation of the actuator stem and the locking sleeve, but allow sufficient axial movement of the locking sleeve to disengage the locking pins from the locking recesses 50.

After the unlocking movement has taken place, movement of the handwheel 78 in the counterclockwise direction is continued until the ball screw actuator mechanism rotates the valve element completely to the open position thereof or to any desired position between the open and closed positions of the valve element. After reaching the desired position of the valve element, the handwheel 78 is released and the compression spring 60 acting through the locking sleeve 54, the drive sleeves 70 and the cooperative relationship between the drive pin 84 and cam surfaces 88 and 90, result in clockwise biasing of the drive sleeve 70 until the drive sleeve is rotated sufficiently to move the pin 84 to the root or bottom of the V-shaped cam surfaces. When this movement takes place, the compression spring forces the locking sleeve 54 outwardly, thereby causing the locking pins 58 to move into engagement with the locking recesses 50, and thereby securing the locking sleeves and the actuator stem against rotation. It is necessary, of course, for the locking pins and locking recesses to align before the locking movement occurs.

When it is desired to close the valve, it is simply necessary to grasp the handwheel 78 of the actuator mechanism and rotate the handwheel clockwise thereby causing drive sleeve 70 to rotate clockwise while the locking sleeve and actuator stem are maintained in a locked condition by the locking pins 58. Clockwise rotation of the drive sleeve causes cooperation between the pin 84 and the cam surfaces 88 and 90, thereby resulting in axial movement of the drive sleeve 70 and locking sleeve 54. This causes the locking pins 58 to be withdrawn from locking engagement with the recesses 50, thereby freeing the actuator stem for rotation in a clockwise direction to cause closing of the valve.

Assuming the valve is being opened or closed, and fluid pressure within the valve creates forces that tend to open or close the valve faster than the actuator is being manipulated, it should be borne in mind that the actuator will instantly become locked. When the forces developed by fluid pressure are sufficient to rotate the valve element, the handwheel or other prime mover will, in essence, cease its application of opening or closing forces to the drive sleeve 70. When this occurs, the compression spring 60 will react against the locking sleeve 54, thereby causing the locking sleeve and drive sleeve to be moved outwardly. Counterrotation of the drive sleeve 70 is included by actuation between the pin 84 and the cam surfaces 90 and 88 until the pin has reached the root or bottom portion of the cam configuration. After this has occurred, operator personnel then to proceed with the opening or closing movement, would rotate the handwheel in a direction opposing the opening or closing movements and would apply braking force to the handwheel to control the opening or closing speed of the valve. In the event the actuator stem is released, and opening or closing movements are proceeding faster than is desired, the operator personnel, to achieve relocking of the actuator, would simply release the handwheel, thereby allowing the compression spring 60 to force the locking sleeve 54 and drive sleeve 70 outwardly causing the locking pins 58 to reengage the locking recesses 50. It is not possible, therefore, for the valve to be opened or closed by line pressure faster than is desired because operating personnel can control the speed of opening or closing movement or can cause relocking of the actuator in the event opening or closing movements are proceeding at an undesirable speed.

Regardless of the position of the valve or actuator, the actuator will become locked simply by releasing the handwheel. It is not possible, therefore, for the valve to overhaul, i.e., to move from the open or closed position while not in attendance by operating personnel. The handwheel structure must be positively manipulated before any movement of the valve can take place in either rotative direction thereof.

In view of the foregoing, it is clearly apparent that I have provided a novel mechanical actuator mechanism for valves and other mechanical devices including a locking mechanism that normally maintains the actuator in a locked condition and is capable of being manipulated without the use of tools or accessories to achieve unlocking of the actuator mechanism to impart movement to the valve or other mechanical device with which the actuator is associated. The locking mechanism of my invention is unlocked upon predetermined initial rotation of the handwheel or other suitable prime mover and continued rotation of the handwheel achieves the appropriate movement that is desired. Cessation of rotation of the handwheel or overrunning of the actuator causes automatic relocking of the actuator mechanism to prevent inadvertent rotation of the valve or other mechanical device with which the actuator is associated. My invention, therefore, effectively overcomes the deficiencies of ball screw or Saginaw-type actuators that tend to overhaul by mechanical forces applied through the valve or mechanical device to the actuator mechanism. I have also provided an actuator mechanism that is capable of becoming automatically locked in any desirable position simply by releasing the handwheel or otherwise stopping the prime mover controlling the actuator manipulation. The novel actuator of my invention may be unlocked and actuated simply by rotating the actuator handwheel or prime mover in either rotative direction thereof. The locking mechanism of the actuator remains in assembly with the actuator handwheel or power unit at all times and need not subjected to additional manipulation before locking and unlocking of the actuator mechanism can occur. To achieve the unlocking movement, it is simply necessary to grasp the handwheel and rotate the same in either desired direction. My invention is, therefore, well adapted to obtain all of the objects and advantages herein above set forth together with other advantages which will become obvious and inherent from a description of the apparatus itself.

It will be understood that certain combinations and subcombinations are of utility and may be employed without reference to other features and combinations. As many possible embodiments may be made of my invention without imparting from the spirit or scope thereof, it is to be understood that all matters herein set forth or illustrated in the accompanying drawings are to be interpreted as illustrative and not in a limiting sense.

I claim:

1. A mechanical actuator comprising a housing having a rotatable actuating stem extending therefrom, driving means for imparting rotation to said actuating stem, said housing having means defining locking recess means about said actuating stem, locking means carried by said actuating stem and being normally biased into engagement with said locking recess means to lock said actuating stem against rotation, said locking means being moved upon predetermined initial rotation of said driving means thereby causing disengagement of said locking means from said locking recess means, whereby continued rotation of said driving means subsequent to said disengagement will result in rotation of said actuating stem and discontinuation of said rotation, reversing of said rotation or overhauling of said actuator causing reengagement of said locking recess means and said locking means.

2. A mechanical actuator as recited in claim 1; said locking means comprising a tubular member surrounding said valve stem, means preventing relative rotation between said tubular member and said stem, but allowing axial movement of said tubular member relative to said stem, said lacking means being at one extremity of said tubular member and normally engaging said locking recess means thereby securing said stem in nonrotatable relation relative to said housing.

3. A mechanical actuator is recited in claim 1; said driving means comprising lock-actuating means carried to said stem and defining cam surface means, cam-engaging means carried by said stem and being disposed in engagement with said cam surface means, means for imparting rotation to said lock-actuating means, said cam surface means and said cam-engaging means being moved one relative to the other upon rotation of said lock-actuating means and causing said lock-actuating means to drive said locking means axially relative to said stem thereby causing said disengagement and allowing said actuator stem to be rotated freely.

4. A mechanical actuator as recited in claim 1; said locking means comprising a first sleeve disposed about said actuator stem and having means at one extremity for engaging said locking recess means, at least one elongate opening formed in said first sleeve, pin means carried by said actuator stem and extending through said elongated opening to prevent relative rotation between said first sleeve and said actuator stem and to allow axial movement of said first sleeve relative to said actuator stem, said driving means comprising a second sleeve disposed about said actuator stem in abutment with said first sleeve, cam surface means defined by said second sleeve, pin means fixed to said actuator stem and engaging said cam surface means, means for imparting rotation to said second sleeve means relative to said actuator stem thereby causing said engaging pin and cam surface means to drive said second sleeve and said first sleeve linearly to cause said disengagement.

5. A mechanical actuator as recited in claim 4; said second sleeve having drive surface means thereon, said pin engaging said drive surface means at the end of said cam surface and establishing a direct driving relation between said second sleeve and said actuator stem.

6. A mechanical actuator as recited in claim 4; said cam surface means comprising a pair of inclined cams for engagement with said pin to impart axial movement to said second sleeve for axial driving movement of said first sleeve regardless of the direction which said second sleeve is rotated.

7. A mechanical actuator as recited in claim 6; bearing means surrounding said actuating stem and being interposed between the first and second sleeves.

8. A mechanical valve actuator comprising a housing adapted for mounting on a valve, said actuator having a drive mechanism for imparting opening and closing movement to the valve, a rotatable actuating stem extending from said housing and being operatively connected to said drive mechanism, means disposed about said actuating stem and defining locking recess means, locking sleeve means being nonrotatably received in axially movable relation about said actuating stem and having locking means provided thereon, means normally biasing said locking sleeve linearly and causing locking engagement of said locking means with said locking recesses to prevent rotation of said actuating stem relative to said housing, drive sleeve means disposed about said actuating stem relative to said housing, drive sleeve means disposed about said actuating stem and abutting said locking sleeve means, means connected to said drive sleeve means for imparting rotation thereto said drive sleeve upon being rotated moving said locking sleeve means axially against said biasing means thereby disengaging said locking means from said locking recess means and allowing said actuating stem to rotate, said drive sleeve upon ceasing rotation of said actuating stem being movable axially by said biasing means thereby allowing reengagement between said locking means and said locking recess means.

9. A mechanical valve actuator as recited in claim 8; said locking recess means comprising a body having an aperture through which said actuating stem extends, said body being fixed to said housing, said locking recess means being defined in said body.

10. A mechanical valve actuator as recited in claim 8; cam means formed on said drive sleeve means, cam-engaging means carried by said actuating stem and cooperating with said cam means to drive said locking sleeve axially upon initial rotation of said drive means.

11. A mechanical valve actuator as recited in claim 10; means to limit relative rotation of said drive means and said actuating stem to provide for rotative driving of said actuating stem subsequent to disengagement of said locking means from said locking recess means.

12. A mechanical valve actuator as recited in claim 10; said cam means being opposed generally V-shaped slots formed in said drive sleeve means, said cam-engaging means comprising a pin extending transversely through said actuating stem, each extremity of said pin being disposed within a respective one of said V-shaped slots.

13. A mechanical valve actuator as recited in claim 12; drive surface means defined on said drive sleeve means, said pin engaging said drive surface means after predetermined rotation of said drive sleeve means relative to said actuating shaft, whereby further rotation of said drive sleeve means imparts direct rotation to said actuating stem.

* * * * *

PO-1050
(5/69)

UNITED STATES PATENT OFFICE
CERTIFICATE OF CORRECTION

Patent No. 3,622,119                     Dated   November 23, 1971

Inventor(s) Joseph Paul Weber

It is certified that error appears in the above-identified patent and that said Letters Patent are hereby corrected as shown below:

Title, "Mechamism" should read -- Mechanism --

Column 1, line 19, "threaded" should read -- thread --; line 27, "Overhauling" should read -- Shutoff --

Column 2, line 7, "to" should read -- at --

Column 6, lines 70 and 71, delete "relative to said housing, drive sleeve means disposed about said actuating stem"

Signed and sealed this 9th day of May 1972.

(SEAL)
Attest:

EDWARD M. FLETCHER, JR.
Attesting Officer

ROBERT GOTTSCHALK
Commissioner of Patents